INVENTORS
DONALD J. BLUNDEN
ISRAEL D. PEISNER
BY WILLIAM R. BAKER

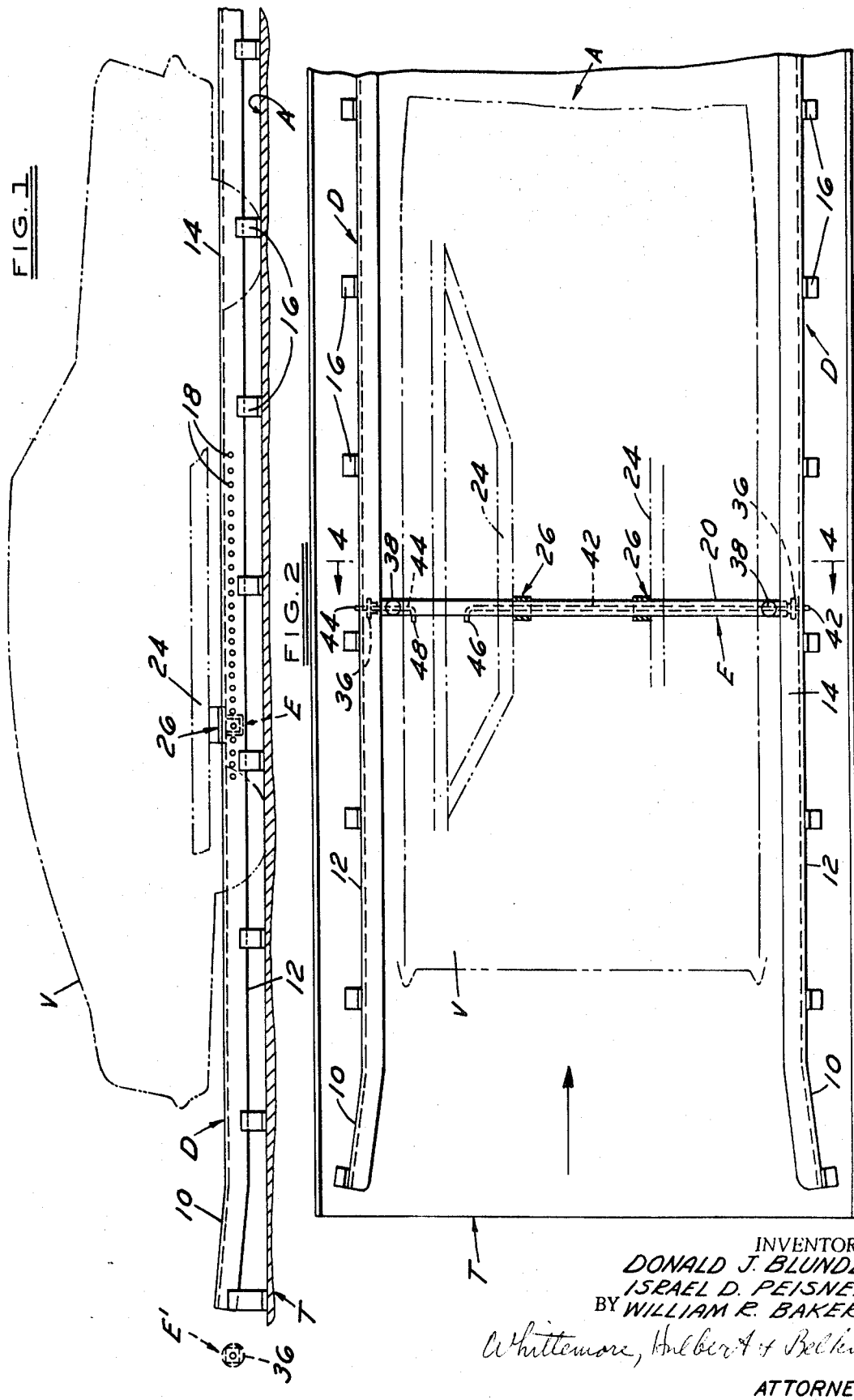

ATTORNEYS

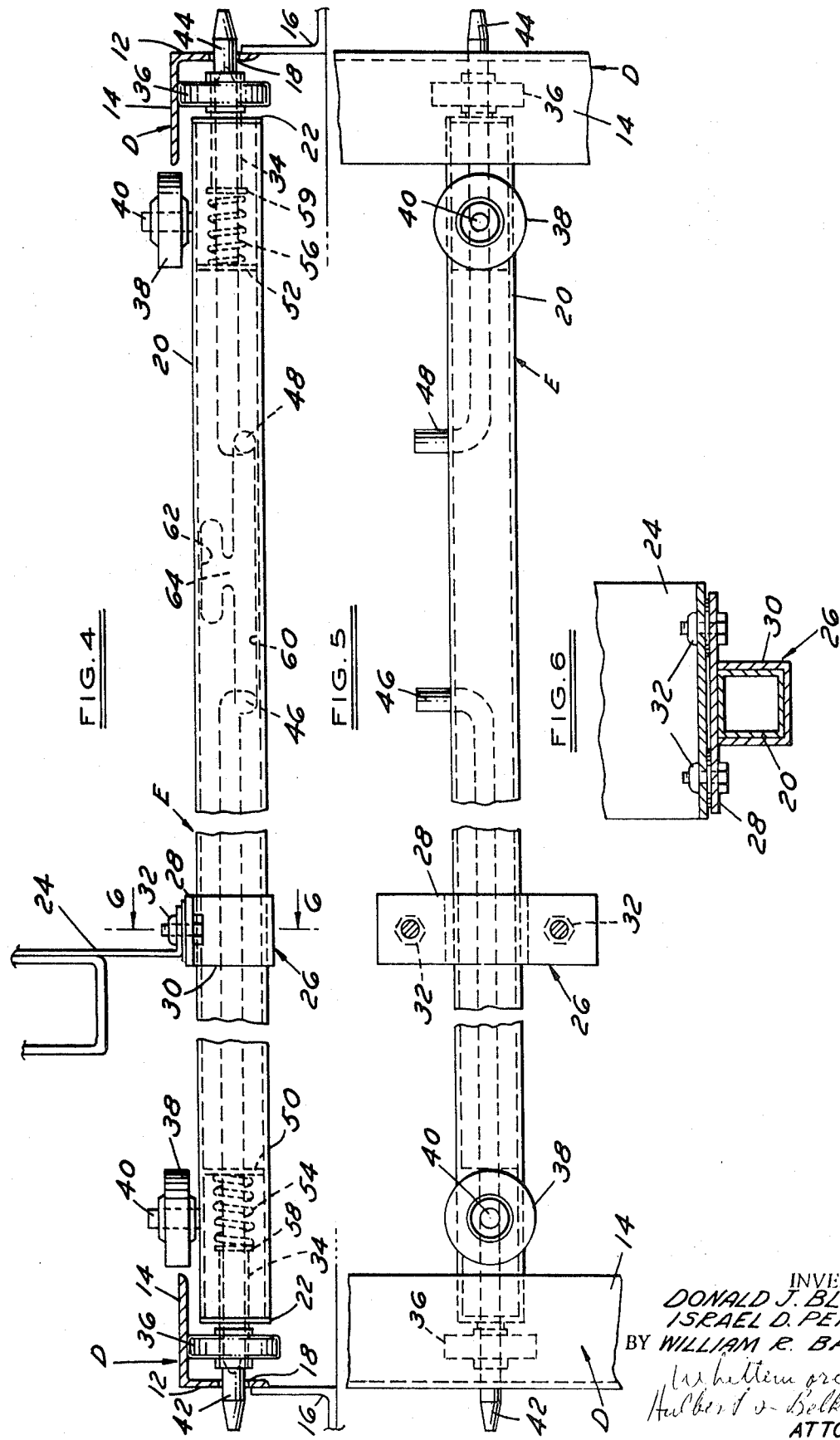

United States Patent Office 3,605,636
Patented Sept. 20, 1971

3,605,636
TIE-DOWN SYSTEM FOR VEHICLES
Donald J. Blunden, Southfield, Israel D. Peisner, Huntington Woods, and William R. Baker, Detroit, Mich., assignors to Whitehead & Kales Company, River Rouge, Mich.
Continuation of application Ser. No. 720,914, Apr. 12, 1968. This application Apr. 29, 1970, Ser. No. 33,070
Int. Cl. B60p 7/08; B61d 45/00
U.S. Cl. 105—368T
14 Claims

ABSTRACT OF THE DISCLOSURE

This invention relates to a tie-down system for vehicles. In the specific embodiment disclosed, a transverse beam is mounted on each vehicle, and laterally spaced rails on a transport are adapted to engage rollers on the ends of the beam to automatically depress the vehicle as it is moved onto the transport between the rails. Any suitable means may be provided to lock the vehicle while in depressed position, and preferably for this purpose locking pins are carried by the beam and are engageable in selected keeper openings in the rails. The beam in the disclosed embodiment is free to slide transversely of the vehicle, and guide rollers on the beam guide it between the rails.

CROSS REFERENCE TO RELATED APPLICATION

This application is a continuation of our earlier filed application Ser. No. 720,914, filed Apr. 12, 1968, now abandoned.

SUMMARY OF THE INVENTION

It is a primary object of this invention to provide an improved, more efficient system for tying down vehicles on a transport which is fast and easy to operate.

Another object of the invention is to provide a tie-down system which automatically depresses the vehicles.

Another object is to provide a tie-down system which automatically depresses the vehicles as they are moved onto the transport so that the over-all height of the transport including the vehicles transported is reduced.

Another object is to provide a tie-down system which eliminates chains, hooks and the like.

Another object is to provide a tie-down system which is positive in operation and which depresses the vehicles to the proper roof height despite the presence of ice or other accumulated material on the deck of the transport.

Another object is to provide a tie-down system which is readily adaptable to present transport equipment.

Another object is to provide a tie-down system which is safe to operate and which eliminates the necessity for special tie-down crews.

Another object is to provide a tie-down system which eliminates or at least minimizes the risk of damage to vehicles being transported.

Another object is to provide a tie-down system in which the vehicles are held rigid, thereby protecting the vehicles, and preventing damage to the frame members of the vehicles.

Another object is to provide a tie-down system which saves underneath clearance.

Other objects and features of the invention will become apparent as the description proceeds, especially when taken in conjunction with the accompanying drawings, wherein:

FIG. 1 is a fragmentary side elevational view, with parts in section, showing a vehicle in dot-dash lines secured upon the deck of a transport by a tie-down system embodying our invention.

FIG. 2 is a top plan view of the structure shown in FIG. 1.

FIG. 4 is a view taken on the line 4—4 of FIG. 2.

FIG. 5 is a plan view of the structure shown in FIG. 4.

FIG. 6 is a fragmentary sectional view taken on the line 6—6 of FIG. 4.

Figure 3:
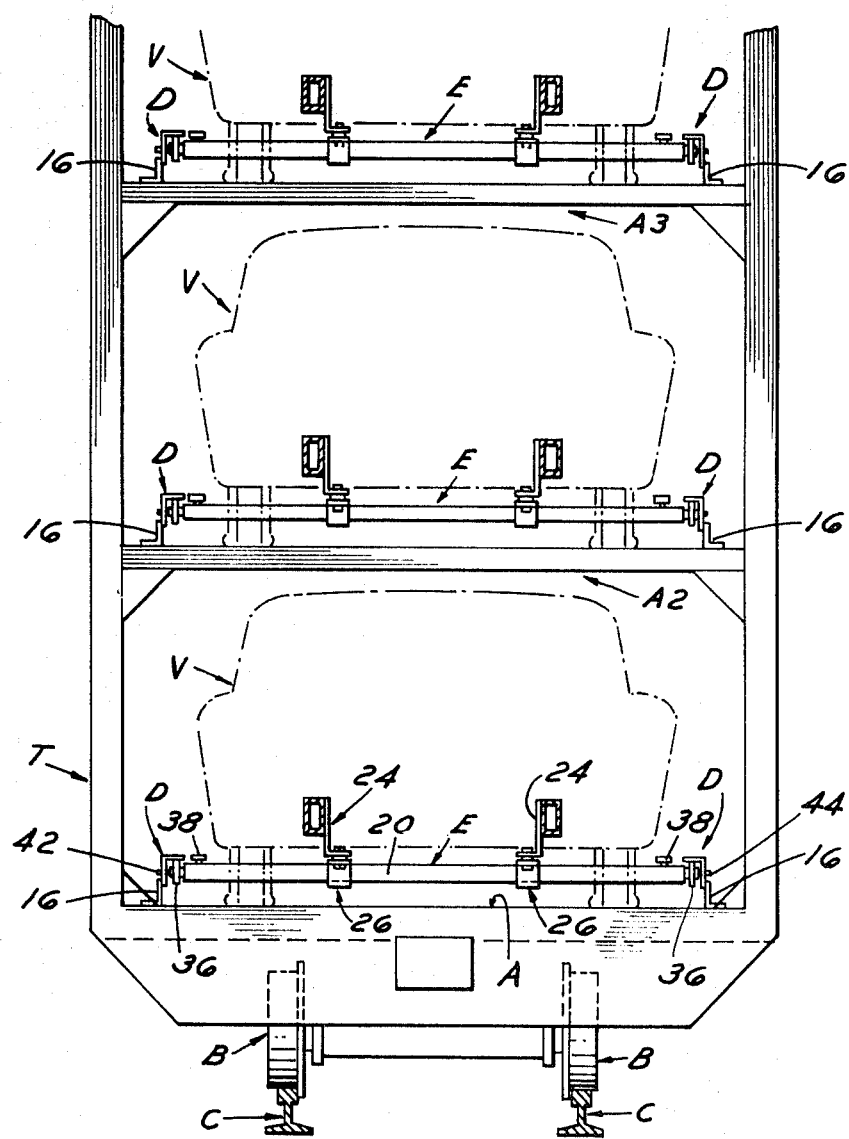
FIG. 3 is an end view of the transport having a plurality of superimposed decks upon which vehicles are secured by the tie-down system of our invention.

Referring now more particularly to the drawings in FIG. 3, A, A2 and A3 are elongated longitudinally extending substantially flat decks of a transport T for vehicles V. The transport T is shown as being a railroad car having wheels B for running on tracks C, although it will be understood that the transport could be something other than a railroad car such, for example, as a highway transport vehicle. The vehicles V are shown as being automotive passenger vehicles although obviously other types of vehicles could be transported. The vehicles are tied down on the decks A, A2 and A3 of the transport T by a tie-down system including laterally spaced side rails D and transverse beams E.

While the transport is shown in FIG. 3 as having three horizontal decks located one above the other and upon which the vehicles V are tied down and transported, it will be understood that any number of decks, that is one or more, may be provided on the transport within the concepts of the present invention. The following description will be concerned with the tieing down of vehicles on deck A, and it should be understood that the same tie-down system may be employed for vehicles on the other decks of the transport.

Preferably the area of each desk is such that it is capable of supporting thereon in tandem several vehicles which may be of different lengths and/or widths. The vehicles are driven or otherwise moved longitudinally onto the deck or decks between the rails D. The rails D are elongated parallel angle members extending lengthwise of the deck in laterally spaced relation and as shown in FIGS. 1 and 2 are substantially straight and horizontal, that is parallel to the deck, throughout most of their lengths. As further shown in these figures, the rails at one end thereof flare laterally outwardly and are inclined upwardly as indicated at 10. The rails may also flare and incline at their opposite ends in the same manner, that is, laterally outwardly and upwardly, so that vehicles may be loaded onto the deck A from either end of the transport.

Each rail D has a vertical laterally outer flange 12 and a horizontal upper flange 14. The rails D are mounted in position in any suitable manner upon the deck A, as by the angle brackets or legs 16. The vertical flanges 12 are provided preferably throughout the full extent of their straight sections with a series of keeper openings 18 which are spaced apart any convenient distance and may, for example, be located on three-inch centers. The keeper openings are provided to receive suitable locking pins to secure the vehicles being transported in tied down position on the deck A of the transport, and while fewer keeper openings could be employed, the large number provided makes it possible to quickly and easily lock the vehicle in tied down position wherever desired longitudinally of the deck.

The side rails D are mounted in fixed position at an elevation such that the vehicles will be depressed when moved onto the deck of the transport between the rails, as more clearly described hereinafter.

Each beam E preferably comprises an elongated tubular member 20 which in the present instance is shown as being square in cross section and closed at the ends by plates 22. The beam E is adapted to be secured to the underframe structure of the vehicle to be tied down. One such beam may be provided for each vehicle, although more than one may be employed, if desired.

As shown in FIGS. 2 and 3, each beam E is preferably attached to two frame members 24 of the vehicle by brackets 26. The brackets 26 may each comprise a plate 28 having a channel 30 welded along the edges of its side flanges to the underside of the plate to provide a square-shaped opening adapted to slidably receive the tubular member 20 of the beam E. The brackets 26 are removably secured to the frame members 24 of the vehicle by the nut and bolt assemblies 32. While the means thus disclosed for attaching the beams E to the frame structures of the vehicles to be tied down has proven to be successful, obviously other specific forms or attachment may be provided.

Tubular axles 34 are welded or otherwise secured to the plates 22 closing the ends of the tubular member 20. The tubular axles 34 extend lengthwise of the tubular member 20, preferably on the longitudinal center line thereof, and project through the plates 22 and beyond the ends of the tubular member as shown, and rollers or followers 36 are rotatably mounted on the projecting ends of the axles.

Guide rollers 38 are preferably mounted on the top of each beam E on vertical axes, as shown. Each guide roller 38 is mounted for rotation on a vertically upwardly extending axle 40 rigidly secured to the tubular member 20 adjacent to the ends thereof.

Locking pins 42 and 44, preferably in the form of elongated rods of circular cross section are provided. The locking pins are tapered to a cone shape at their outer ends for ease of entry into the keeper openings 18. The locking pin 42 extends longitudinally within the tubular member 20 and projects through the tubular axle 34 beyond the roller 36. The inner end of the locking pin 42 is turned at a right angle and provides a hand grip portion 46 which projects through a slot 48 in the wall of the tubular member 20. The locking pin 44 is like the locking pin 42 only shorter. Thus the locking pin 44 extends longitudinally within the tubular member 20 and projects through the other tubular axle beyond the other roller 36. The hand grip portion 48 at the inner end of the locking pin 44 is turned at a right angle and, like the hand grip portion 46, projects through the slot 48 in the wall of the tubular member 20.

Internal transverse plates 50 and 52 secured within the tubular member 20 adjacent the ends thereof are apertured to clear the locking pins 42, 44. Compression coil springs 54, 56 surrounding the respective locking pins are compressed between the plates 50, 52 and abutments 58, 59 on the locking pins urging the locking pins laterally outwardly to their extended positions. The abutments 58, 59 may, for example, consist of bosses or washers on the locking pins.

One locking pin is short and the other long so that the hand grip portions will be located near one end of the beam. Then with the beam secured to the vehicle with the hand grip portions near the driver's side, the driver will have easy access to the hand grip portions before entering or after leaving the vehicle.

The locking pins 42, 44 are shown in FIGS. 1–5 in their extended positions. The extended positions of the locking pins are determined by the engagement of the hand grip portions 46, 48 with the ends of the relatively long longitudinally extending portion 60 of slot 48, as seen in FIG. 4. The extended positions may also be determined by the engagement of abutments 58, 59 with the inner ends of tubular axles 34. It will be noted that the slot 48 also includes a relatively short longitudinally extending portion 62 connected to the portion 60 by an intermediate portion 64 of a width sufficient to clear the hand grip portions 46, 48. The retracted positions of the locking pins are determined by the engagement of the hand grip portions 46, 48 with the ends of the relatively short portion 62 of slot 48.

As seen in FIGS. 4 and 5, the combined length of the tubular member 20 and rollers 36 is less than the distance between the vertical flanges 12 of the side rails D, so that when beam E is mounted on the vehicle V as shown the rollers 36 may engage the undersurfaces of the horizontal flanges 14 of the side rails. It will be noted further that when the locking pins 42, 44 are extended they may project through registering keeper openings 18 in the side rails but when retracted, as seen in dotted lines in FIG. 4, they are withdrawn from the keeper openings. It will further be noted that the distance between the guide rollers 38 is slightly less than the distance between the confronting edges of the horizontal flanges 14 of the side rails D, and that the peripheries of the guide rollers 38 are in positions adapted for engagement with the confronting edges of the flanges 14.

In use, at least one beam E will be attached to the frame members 24 of each vehicle by brackets 26 so as to extend transversely beneath the vehicle as indicated. Preferably the beam is attached at or near the highest point of the vehicle, consistent with optimum springing characteristics of the vehicle. As already stated, the beam E is capable of sliding in the direction of its length in the brackets 26 transversely of the vehicle. Prior to loading a vehicle on the deck A of the transport, the driver will reach under the vehicle, preferably at the driver's side, and retract the locking pins 42, 44 by manipulation of the hand grip portions 46, 48 causing one hand grip portion and then the other to move into the relatively short slot portion 62. When the hand grip portions are released they will engage the ends of the short portion 62 of the slot under the urging of springs 54 and 56 causing the locking pins 42, 44 to assume the retracted positions shown in dotted lines in FIG. 4 in which the ends of the locking pins are spaced apart a distance less than the distance between the vertical flanges 12 of the side rails.

When the vehicle is driven, or otherwise moved, onto the deck A of the transport T, the beam E assumes the positon indicated at E' to the left in FIG. 1 which is somewhat above the level of the horizontal flanges 14 of the side rails D in the straight sections thereof, but below the upper ends of the flared sections 10 of the side rails. As the vehicle moves into the space between the side rails in the direction of the arrow in FIG. 2, the rollers 36 which rotate on horizontal axes engage the undersurfaces of flanges 14 of the side rails. The guide rollers 38 which rotate on vertical axes may contact the confronting edges of the horizontal flanges 14 to locate the beam E transversely in proper positions with respect to the side rails D. The guide rollers 38 thus locate the beam E in proper position transversely of the vehicle even though the vehicle may be out of alignment with respect to the centerline of the transport. As the movement of the vehicle continues toward the position indicated in dot-dash lines in FIGS. 1 and 2, the vehicle is automatically depressed on its springs by the engagement of the horizontal flanges 14 of the side rails D with the rollers 36 as rollers 36 approach and enter the straight sections of the side rails.

When the vehicle is brought to a stop in the desired position longitudinally of the deck, the driver may by manipulation of the hand grip portions 46, 48 release the locking pins 42, 44 from the withdrawn position and by moving the hand grip portions 46, 48 into the long portion 60 of the slot cause the locking pins to be projected to their extended positions under the influence of the compression springs 54, 56 in which positions the locking pins will project through the registering keeper openings 18 in the vertical flanges 12 of the side rails. The vehicle is now securely locked in position against longitudinal movement by the locking pins 42, 44 and is rigidly held depressed by the engagement of rollers 36 with the horizontal flanges 14 of the side rails. The vehicle may oscillate about the beam E, allowing the natural springing effect of the vehicle to be used, where only one beam E per vehicle is employed.

As thus tied down and secured in position, the vehicles have their sprung portions depressed and held rigid by the cooperation between rails D and beams E. The roof height of the vehicles on the deck of the transport will be the same even though there may be an accumulation of ice or the like on the deck. Moreover, the vehicles are automatically depressed upon entering the transport so that the overhead clearance provided may be reduced.

Where a vehicle is to be unloaded, the driver may reach under the vehicle and retract the locking pins to release the vehicle so that it may be driven off the deck.

As noted above both ends of the rails D may be flared and inclined as shown in FIGS. 1 and 2 to permit loading and unloading to and from either end of the transport.

What we claim as our invention is:

1. A tie-down system for a vehicle upon the deck of a transport, comprising a tie-down unit mounted on the vehicle having followers thereon, laterally spaced rails mounted on the deck extending longitudinally thereof, said rails having portions spaced from one end thereof which are lower than said one end and having portions intermediate said lower portions and said one end inclined downwardly in a longitudinal direction toward said lower portions, said rails being engageable over said followers and operative to automatically, positively depress the vehicle in response to movement of the vehicle along the deck in said longitudinal direction, and means operably connected to the vehicle and to said transport for securing the vehicle in depressed condition on the deck.

2. The system defined in claim 1, wherein said tie-down unit comprises an elongated beam extending transversely of the vehicle and having said followers on the ends thereof, and said rails have flanges engaging over said followers as aforesaid.

3. The system defined in claim 2, wherein said followers are rollers.

4. The system defined in claim 1, including means for mounting said tie-down unit on the vehicle for sliding movement transversely of the vehicle, and means on said tie-down unit engageable with said rails to locate said tie-down unit in a position transversely of the vehicle such that said rails will engage over said followers as aforesaid.

5. The system defined in claim 1, wherein said securing means comprise keepers spaced along the length of said rails, and releasable locking pins on said tie-down unit for selective engagement with said keepers.

6. A tie-down system for a vehicle upon the deck of a transport, comprising an elongated beam, means mounting said beam on the vehicle transversely thereof, said beam having rollers on the ends thereof, laterally spaced side rails mounted on the deck and extending longitudinally thereof, said rails having generally horizontal flanges, said flanges having portions spaced from one end thereof which are lower than said one end and having portions intermediate said lower portions and said one end inclined downwardly in a longitudinal direction toward said lower portions, said flanges being adapted to engage over said rollers and operative to automatically, positively depress the vehicle in response to movement of the vehicle along the deck between said rails in said longitudinal direction, and means for securing the vehicle in depressed condition on the deck.

7. The system defined in claim 6, wherein said beam mounting means mounts the same on the vehicle for longitudinal sliding movement transversely of the vehicle, and guide rollers mounted on said beam adjacent the ends thereof for engagement with the laterally inner edges of said generally horizontal flanges to locate said beam in a position transversely of the vehicle such that said generally horizontal flanges engage over said first-mentioned rollers as aforesaid.

8. The system defined in claim 6, wherein said securing means comprise generally vertical flanges extending downward from the laterally outer edges of said generally horizontal flanges, keeper openings in said vertical flanges spaced from one another along the length thereof, and releasable locking pins on said beam selectively engageable with said keeper openings.

9. The system defined in claim 8, wherein said locking pins extend lengthwise of said beam and respectively project beyond the opposite ends of said beam, spring means urging said pins to extended positions engageable with said keeper openings, and means for releasably holding said pins in retracted positions withdrawn from said keeper openings.

10. The system defined in claim 8, said beam comprising an elongated tubular member, said locking pins extending lengthwise within said tubular member and being axially slidable to extended positions respectively projecting beyond the opposite ends of said tubular member, spring means urging said pins to said extended positions in which the outer ends thereof are engageable in said keeper openings, a slot in the wall of said tubular member, said pins having offset inner end portions projecting through said slot, said slot having a first portion adapted to be contacted by said offset portions to determine said extended positions of said pins and having a second portion adapted to be contacted by said offset portions to hold said pins in retracted positions withdrawn from said keeper openings.

11. The system defined in claim 10, wherein said first portion of said slot is elongated lengthwise of said tubular member and the ends of which are adapted to be contacted by said offset portions of said pins as aforesaid to determine said extended positions of said pins, said second portion of said slot being elongated lengthwise of said tubular member but being shorter than said first portion, the ends of said first portion being adapted to be contacted by said offset portions of said pins as aforesaid to determine and retracted positions of said pins.

12. The system defined in claim 6, wherein said flanges flare laterally outwardly and are inclined upwardly at said one end thereof.

13. A tie-down system for a vehicle upon the deck of a transport, comprising a tie-down unit mounted on the vehicle having followers thereon, guide means mounted on the deck including laterally spaced rail portions extending longitudinally of the deck, said guide means including entering guide portions adjacent one end of said rail portions leading to said rail portions from an elevation thereabove, said entering guide portions and rail portions being engageable with said followers and operative to automatically, positively depress the vehicle in response to movement of the vehicle along the deck in a longitudinal direction, and means for securing the vehicle in depressed condition on the deck.

14. A tie-down system for a vehicle upon the deck of a transport, comprising follower means mounted on the vehicle, guide means mounted on the deck including an elongated rail portion extending longitudinally of the deck, said guide means including an entering guide portion adjacent one end of said rail portion leading to said rail portion from an elevation thereabove, said entering guide portion and rail portion being engageable in sequence with said follower means and operative to automatically, positively depress the vehicle in response to movement of the vehicle along the deck in a longitudinal direction, said rail portion being of substantial length and operative to hold the vehicle depressed at any point along the length thereof engaged by said follower means, and means for securing the vehicle in a depressed condition on the deck at selected points along the length of said rail portion.

References Cited
UNITED STATES PATENTS

| | | | |
|---|---|---|---|
| 1,552,644 | 9/1925 | Perin | 214—38.22 |
| 1,894,950 | 1/1933 | Fitch | 214—38.22 |
| 2,818,033 | 12/1957 | Gutridge et al. | 105—368S |

DRAYTON E. HOFFMAN, Primary Examiner

U.S. Cl. X.R.

248—119R